US008676566B2

(12) United States Patent
Myaeng et al.

(10) Patent No.: US 8,676,566 B2
(45) Date of Patent: Mar. 18, 2014

(54) METHOD OF EXTRACTING EXPERIENCE SENTENCE AND CLASSIFYING VERB IN BLOG

(75) Inventors: Sung Hyon Myaeng, Daejeon (KR); Keun Chan Park, Daejeon (KR); Yoon Jae Jeong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 278 days.

(21) Appl. No.: 13/177,703

(22) Filed: Jul. 7, 2011

(65) Prior Publication Data

US 2013/0013289 A1    Jan. 10, 2013

(51) Int. Cl.
*G06F 17/27* (2006.01)

(52) U.S. Cl.
USPC .......................................................... 704/9

(58) Field of Classification Search
None
See application file for complete search history.

(56) References Cited

U.S. PATENT DOCUMENTS

| 8,396,741 B2 * | 3/2013 | Kannan et al. | 705/7.42 |
| 2009/0198488 A1 * | 8/2009 | Vigen | 704/9 |
| 2012/0245925 A1 * | 9/2012 | Guha et al. | 704/9 |

OTHER PUBLICATIONS

Jijkoun et al., "Mining User Experiences from Online Forums: An Exploration", Proceedings of the NAACL HLT 2010 Workshop on Computational Linguistics in a World of Social Media, pp. 17-18, Los Angeles, California, Jun. 2010.*
Park et al., "Detecting Experiences from Weblogs", Proceedings of the 48th Annual Meeting of the Association for Computational Linguistics, pp. 1464-1472, Uppsala, Sweden, Jul. 11-16, 2010.*
Siegel et al., "Learning Methods to Combine Linguistic Indicators: Improving Aspectual Classification and Revealing Linguistic Insights", Computational Linguistics, vol. 26, Issue 4, pp. 595-628, Dec. 2000.*
Inui et al., "Experience Mining: Building a Large-Scale Database of Personal Experiences and Opinions from Web Documents", IEEE/WIC/ACM International Conference on Web Intelligence and Intelligent Agent Technology, vol. 1, pp. 314-321, Dec. 9-12, 2008.*
Zarcone et al., "Computational Models of Event Type Classification in Context", Proceedings of the International Conference on Language Resources and Evaluation, LREC 2008, May 26-Jun. 1, 2008.*
Kurashima et al., "Mining and Visualizing Local Experiences from Blog Entries", Database and Expert Systems Applications, 17th International Conference, DEXA 2006, Kraków, Poland, Sep. 4-8, 2006.*
Kurashima et al., "Discovering Association Rules on Experiences from Large-Scale Blog Entries", Advances in Information Retrieval, 31th European Conference on IR Research, ECIR 2009, Toulouse, France, Apr. 6-9, 2009.*

* cited by examiner

*Primary Examiner* — Brian Albertalli
(74) *Attorney, Agent, or Firm* — The Webb Law Firm (57) ABSTRACT

Provided are a method of extracting an experience-revealing sentence from a blog document and a method of classifying verbs into activity verbs and state verbs in a sentence recorded in a blog document. The method of extracting an experience sentence from a blog document includes generating a sentence classifier using a machine learning algorithm based on grammatical features, and classifying experience sentences that represent actual experiences of users and non-experience sentences that represent no experience in the blog document using the sentence classifier. By classifying sentences in a blog document into experience sentences and non-experience sentences, it is possible to extract experiences that a user has actually had or that have actually happened to a user from the document.

19 Claims, 6 Drawing Sheets

METHOD OF EXTRACTING EXPERIENCE SENTENCE AND CLASSIFYING VERB IN BLOG

BACKGROUND

1. Field of the Invention

The present invention relates to a method of extracting an experience-revealing sentence from a blog document and a method of classifying activity verbs and state verbs in sentences recorded in a blog document, and more particularly, to a method of classifying sentences of blog text into experience sentences and non-experience sentences using grammatical features such as tense, mood, aspect, modality, experiencer, and verb classes.

2. Discussion of Related Art

Web documents contain various pieces of information such as facts, opinions, and experiences. In particular, experiences play an important role in making decisions or solving problems. Blogs, a kind of web documents, contain abundant user experiences, unlike other web documents such as news articles and homepages.

In the field of information extraction, there are methods of mining user experiences from blogs. These methods are intended to extract attributes such as who, where, when, what, and why from a blog document and structuralize and store an experience using natural language processing technology and machine learning technology.

However, a conventional information extraction method has the following problem. For example, when a sentence "Probably, she will laugh and dance in his funeral" is in a blog document, a structuralized experience "She, Funeral, Laugh and dance" is extracted. In this way, the hypothesis that has not actually happened is extracted as an experience. This is because all text in the blog document has been assumed to be experiences.

SUMMARY OF THE INVENTION

The present invention is directed to providing a method of automatically classifying sentences expressing actual experiences and sentences not expressing actual experiences (i.e., non-experience sentences) in a blog document using various grammatical features to extract experiences that a user has actually had or that have actually occurred.

The present invention is also directed to providing a method of automatically classifying activity verbs that play an important role in experience extraction using various statistical features on the basis of Vendler's verb theory.

According to an aspect of the present invention, there is provided a method of extracting an experience sentence from a blog document, including: generating a sentence classifier using a machine learning algorithm based on grammatical features; and classifying experience sentences that represent actual experiences of users and non-experience sentences that represent no experience in the blog document using the sentence classifier.

Generating the sentence classifier may include: extracting the grammatical features from given training data; and generating the sentence classifier for classifying sentences using the machine learning algorithm based on the extracted grammatical features.

The machine learning algorithm may be a support vector machine (SVM) algorithm.

Extracting the grammatical features from the given training data may include: extracting tense from sentences included in the training data; extracting mood from the sentences; extracting aspect from the sentences; extracting modality from the sentences; extracting experiencers from the sentences; and extracting verb classes from the sentences.

Extracting the tense may include extracting the tense by part-of-speech (POS) tagging.

Extracting the mood may include extracting the mood using punctuation marks and the orders of POS occurrences in the sentences.

Extracting the aspect may include extracting the aspect by POS tagging.

Extracting the modality may include extracting the modality using POS tagging and a modal dictionary.

Extracting the experiencers may include extracting the experiencers by parsing and using a named-entity recognizer.

Extracting the verb classes may include extracting the verb classes using an activity verb dictionary.

Classifying the experience sentences that represent actual experience of users and the non-experience sentences that represent no experience in the blog document using the sentence classifier may include: preprocessing text of the blog document; extracting grammatical features from the preprocessed blog document; and classifying the experience sentences and the non-experience sentences using the sentence classifier on the basis of the extracted grammatical features.

Preprocessing the text of the blog document may include performing hypertext markup language (HTML) parsing and sentence tokenization of the blog document.

Extracting the grammatical features from the preprocessed blog document may include: tagging the sentences from which the grammatical features will be extracted with POSs; parsing the sentences from which the grammatical features will be extracted; recognizing entity names of the sentences from which the grammatical features will be extracted; loading a dictionary for extracting grammatical features; and extracting tense, aspect, mood, modality, experiencer, and verb class features from the sentences using the dictionary.

According to another aspect of the present invention, there is provided a method of classifying a verb in a blog document, including: generating a verb classifier using a machine learning algorithm based on statistical features; and classifying activity verbs that represent acts and activities of a person and state verbs that represent feelings and perceptions of a person in a blog document using the sentence classifier.

Generating the verb classifier may include: extracting the statistical features from a training verb set including activity verbs and state verbs; and generating the verb classifier for classifying verbs using the machine learning algorithm based on the extracted statistical features.

Extracting the statistical features may include: generating an appropriate query about a given verb for a search engine; and extracting a statistical value of the query from the search engine.

Generating the appropriate query may include generating the query using a test pattern of Vendler's verb theory.

Extracting the statistical value of the query from the search engine may include extracting the statistical value using a search engine application programming interface (API) and a regular expression.

The machine learning algorithm may be an SVM algorithm.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present invention relates to a method of extracting an experience of a user from text in a blog document, whereby sentences in the blog are classified into experience sentences and non-experience sentences using a variety of grammatical features. That is, unlike a conventional experience extraction method, experiences that a user has actually had or that have actually occurred are extracted. The following sentences are examples that are not extracted as containing an experience according to an exemplary embodiment of the present invention, but which are extracted as containing an experience according to conventional art. As shown below, the following sentences are hypotheses, questions, orders, etc. rather than actual experiences.

(1) If Jason arrives on time, I'll buy him a drink.
(2) Probably, she will laugh and dance in his funeral.
(3) Can anyone explain what is going on here?
(4) Don't play soccer on the roads!

An experience defined in the present invention denotes an activity that a user has actually done or an event that has happened to a user. Typical experience sentences defined in the present invention are as follows.

(1) I ran with my wife three times a week until we moved to Washington, D.C.
(2) Jane and I hopped on a bus into the city center.
(3) We went to a restaurant near the central park.

Figure 1:
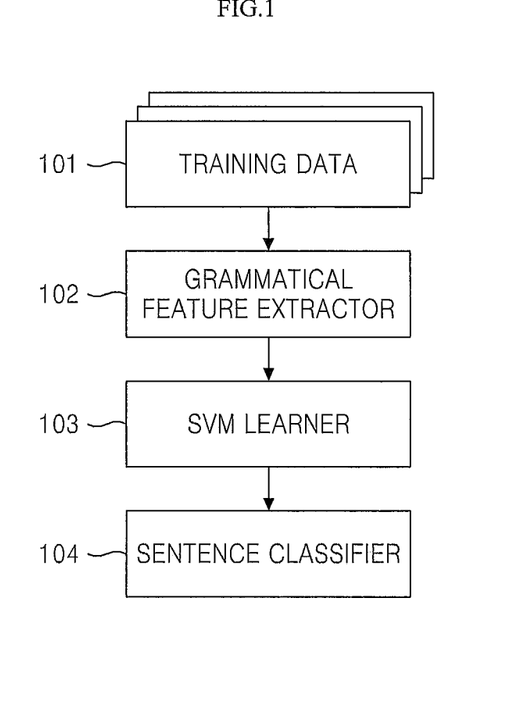
FIG. 1 is a conceptual diagram illustrating generation of an experience sentence classifier according to an exemplary embodiment of the present invention.

FIG. 1 is a conceptual diagram illustrating generation of an experience sentence classifier according to an exemplary embodiment of the present invention.

Referring to FIG. 1, generation of a sentence classifier according to an exemplary embodiment of the present invention involves training data 101, a grammatical feature extractor 102, a support vector machine (SVM) learner 103, and a sentence classifier 104.

The training data 101 consists of experience sentences and non-experience sentences. A large number of sentences are sampled from actual blog document data, and a plurality of evaluators tag each of the sentences with whether or not the sentence represents an actual experience. The results of tagging performed for each of the sentences by the majority of the evaluators are used as training data.

The grammatical feature extractor 102 extracts grammatical features required for sentence classification from a given sentence. Grammatical features taken into consideration according to an exemplary embodiment of the present invention are six features, that is, tense, mood, aspect, modality, experiencers, and verb classes.

The SVM learner 103 generates the sentence classifier 104 using an SVM algorithm using those features extracted from the training data 101 by the grammatical feature extractor 102. In an exemplary embodiment of the present invention, the machine learning method is used because rule-based methods cannot cover the overall diversity of sentences in a blog document while the machine learning method enables rough estimation on even a sentence that is seen for the first time.

The sentence classifier 104 determines whether or not a sentence given to the classifier 104 itself trained using the training data 101 represents an experience.

Figure 2:
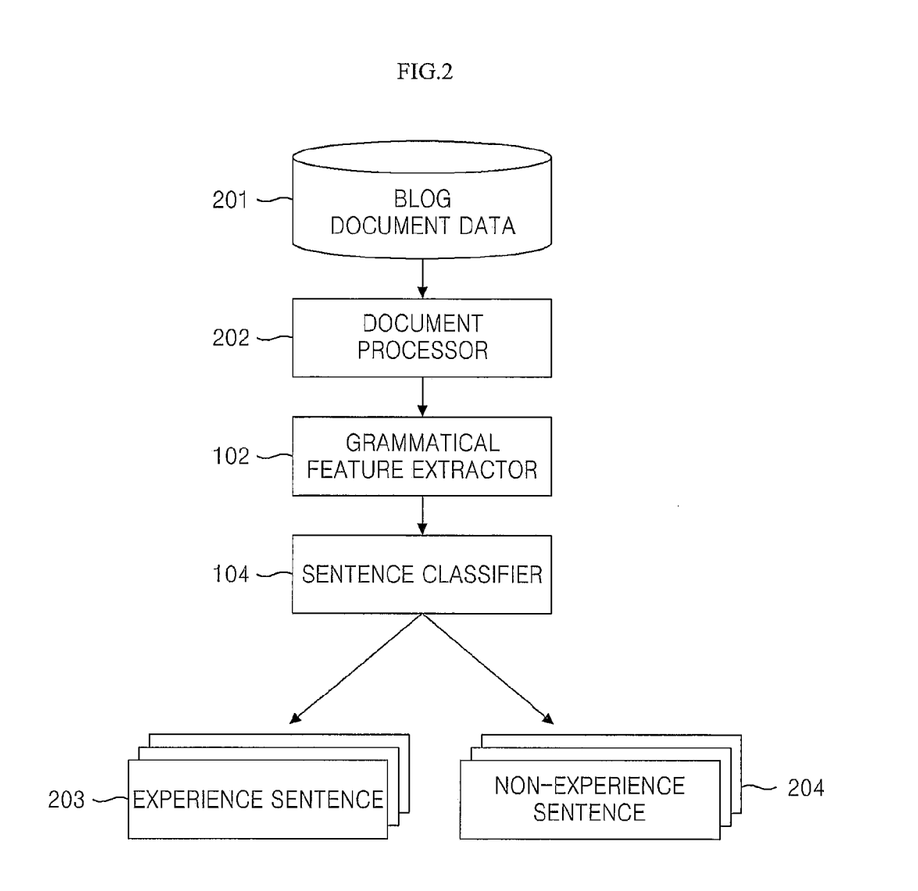
FIG. 2 is a conceptual diagram illustrating a process of classifying an experience sentence according to an exemplary embodiment of the present invention.

FIG. 2 is a conceptual diagram illustrating a process of classifying an experience sentence according to an exemplary embodiment of the present invention. As illustrated in the drawing, the process of classifying an experience sentence according to an exemplary embodiment of the present invention involves blog document data 201, a document processor 202, a grammatical feature extractor 102, a sentence classifier 104, experience sentences 203, and non-experience sentences 204.

The blog document data 201 is a large quantity of blog documents collected from an actual web.

The document processor 202 preprocesses text of the blog documents. The blog documents are hypertext markup language (HTML) documents and undergo HTML parsing and sentence tokenization to extract text in the blog documents that will be classified according to an exemplary embodiment of the present invention. For HTML parsing and sentence tokenization, a variety of libraries widely used in the corresponding field may be used.

The blog document data 201 is preprocessed by the document processor 202, and grammatical features extracted by the grammatical feature extractor 102 are classified by the previously generated sentence classifier 104, resulting in the experience sentences 203 and the non-experience sentences 204.

A method for the grammatical feature extractor 102 to extract features according to an exemplary embodiment of the present invention will be described below with reference to FIG. 3.

Figure 3:
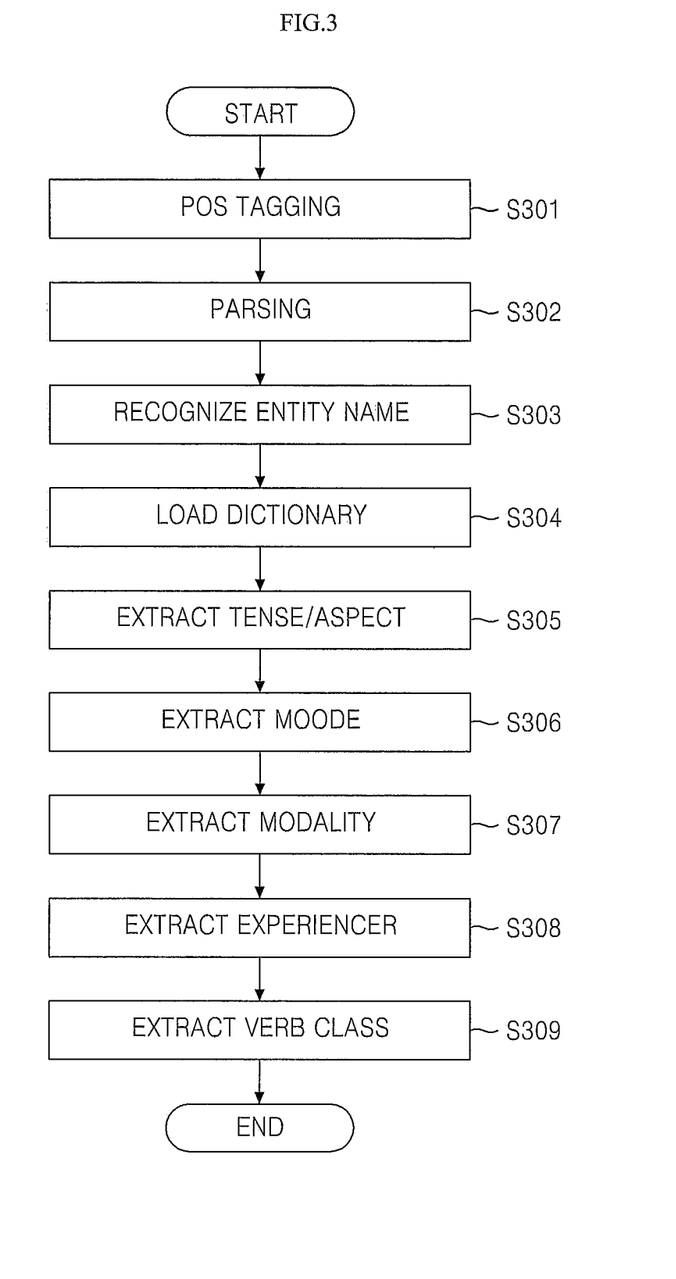
FIG. 3 is a flowchart illustrating a process of extracting grammatical features for classifying an experience sentence according to an exemplary embodiment of the present invention.

FIG. 3 is a flowchart illustrating a process of extracting grammatical features for classifying an experience sentence according to an exemplary embodiment of the present invention.

Referring to FIG. 3, first, a sentence from which grammatical features will be extracted is tagged with parts-of-speech (POSs) (S301). In step 301, POS tagging may use a variety of libraries widely used in the corresponding field. The tagged POS information provides basic information for extracting the six grammatical features.

Subsequently, the sentence from which grammatical features will be extracted is parsed (S302). In step 302, parsing may use a variety of libraries widely used in the corresponding field. A sentence structure and intra-sentence dependency information extracted by parsing provide information for extracting experiencer and verb class features.

Subsequently, an entity name of the sentence from which grammatical features will be extracted is recognized (S303). In step 303, entity name recognition may use a variety of libraries widely used in the corresponding field. In general, entity name recognition denotes recognition of a place name, a person's name, a company name, and a product name. The extracted entity name is used as information for extracting an experiencer feature.

Subsequently, a dictionary for extracting grammatical features is loaded (S304). In an exemplary embodiment of the present invention, a dictionary in which modality expressions are collected and a dictionary in which activity verbs are collected may be loaded. A method of collecting activity verbs and generating the activity verb dictionary will be described later.

Since an experience defined in the present invention is an activity that a user has actually done or an event that has happened to a user, an expression relating to an activity of the user (e.g., run, swim, or walk) is required. On the other hand, expressions relating to a state are not considered as an experience (e.g., "I love this place" and "I know him").

The activity verb dictionary provides information for extracting a verb class feature. The modal dictionary is a dictionary in which modality expressions are collected. A modality dictionary is a dictionary in which modals (e.g., can, will, must, and may) that change a characteristic of a verb such as probability, permission, and intention and expressions serving as modals (e.g., have to, and need to) are collected. In an exemplary embodiment of the present invention, the modality dictionary serves to provide information for extracting a modality feature.

Subsequently, tense and aspect features are extracted (S305). Tense and aspect are important features for classifying an experience sentence. For example, "I will run tomorrow" and "I am going to run tomorrow" are non-experience sentences due to the future tense and the progressive aspect. Tense and aspect of a verb in a sentence are extracted using the tagged POS information.

Subsequently, a mood feature is extracted (S306). A mood is an important feature for classifying an experience sentence. For example, "Go to school!" and "Did she come to school?" are non-experience sentences due to the imperative and interrogative moods. A mood is estimated on the basis of a rule in consideration of which POS a sentence begins with, and which one of imperative, interrogative, and declarative sentences a sentence punctuation mark indicates.

Subsequently, a modality feature is extracted (S307). A modality is an important feature for classifying an experience sentence. For example, "She might be there" is a non-experience sentence because the modality of the sentence has been changed by a modal "might." Modality is estimated by looking up whether an expression recorded in the modality dictionary exists in the sentence.

Subsequently, an experiencer feature is extracted (S308). An experiencer is also an important feature for classifying an experience sentence. For example, "Golden leaves were swept out of the streets" does not have a subject, that is, an experiencer, in the sentence itself and thus is a non-experience sentence. An experiencer is estimated on the basis of a rule in consideration of subject information and POS information provided by parsing and a person's name provided by entity name recognition.

Finally, a verb class feature is extracted (S309). Verb classes are also an important feature for classifying an experience sentence. Verb classes denote two classes of activity verbs and state verbs. For example, "I know that theory" is a non-experience sentence due to a state verb "know." This is because knowing a theory is not an activity that a user actually does or an event that happens to a user. A verb class is estimated by looking up whether a verb in the sentence exists in the activity verb dictionary built according to an exemplary embodiment of the present invention.

A method of classifying a verb in a blog document according to another exemplary embodiment of the present invention will be described below with reference to FIGS. 4 to 6.

Figure 4:
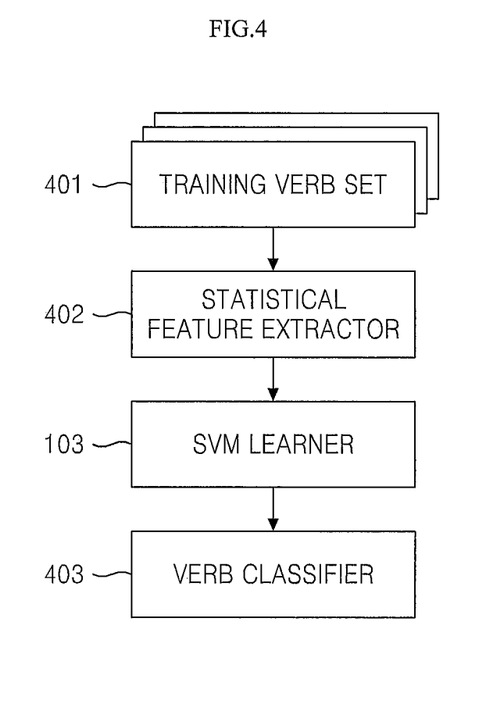
FIG. 4 is a conceptual diagram illustrating generation of an activity verb classifier according to an exemplary embodiment of the present invention.

FIG. 4 is a conceptual diagram illustrating generation of an activity verb classifier according to an exemplary embodiment of the present invention.

Referring to FIG. 4, generation of a verb classifier according to an exemplary embodiment of the present invention involves a training data set 401, a statistical feature extractor 402, an SVM learner 103, and a verb classifier 403.

The training data set 401 consists of a small number of activity verbs and state verbs. Table 1 below shows examples of typical activity verbs and state verbs mentioned in writings of Vendler. As shown in Table 1 below, activity verbs represent acts and activities of a person, and state verbs represent feelings and perceptions of a person.

TABLE 1

| Activity Verb | State Verb |
| --- | --- |
| Run, Swim, Walk, Paint (picture), Build (house) | Like, Know, Believe, Recognize, Realize |

Vendler has suggested some tests as a method for easily classifying activity verbs and state verbs. These tests are not applied to all activity verbs and state verbs but can be applied to most activity verbs and state verbs. Tests used in an exemplary embodiment of the present invention are as follows.

(1) Progressive: A state verb used in the progressive form is awkward.
  A. John is running. (O)
  B. John is liking. (X)
(2) Force: A state verb used as a complement of a verb "force" is awkward.
  A. John forced harry to run. (O)
  B. John forced harry to know. (X)
(3) Stop: A state verb used as a complement of a verb "stop" is awkward.
  A. John stopped miming. (O)
  B. John stopped knowing. (X)
(4) For: A state verb used with a time clause "for a time period" is awkward.
  A. John ran for an hour. (O)
  B. John realized for an hour. (X)
(5) Carefully: A state verb used with an adverb "carefully" is awkward.
  A. John runs carefully. (O)
  B. John knows carefully. (X)

The statistical feature extractor 402 extracts statistical features required for verb classification from a given verb by a search engine using the above-mentioned verb classification tests. The tests have been designed from the viewpoint of linguistics, and enable a person to recognize awkwardness when he/she reads a sentence. In an exemplary embodiment of the present invention, statistics of the tests are made using the search engine on the following assumption: when an awkward expression is input to the search engine, there will be few search results. A statistical feature extraction method will be described in detail later.

The SVM learner 103 generates the verb classifier 403 using an SVM algorithm using those features extracted from the training verb set 401 by the statistical feature extractor 402. In an exemplary embodiment of the present invention, a classification task based on numerical features and using the SVM algorithm shows excellent performance.

The sentence classifier 403 determines whether the verb given to the classifier 403 itself trained using the training verb set 401 is an activity verb or a state verb.

Figure 5:
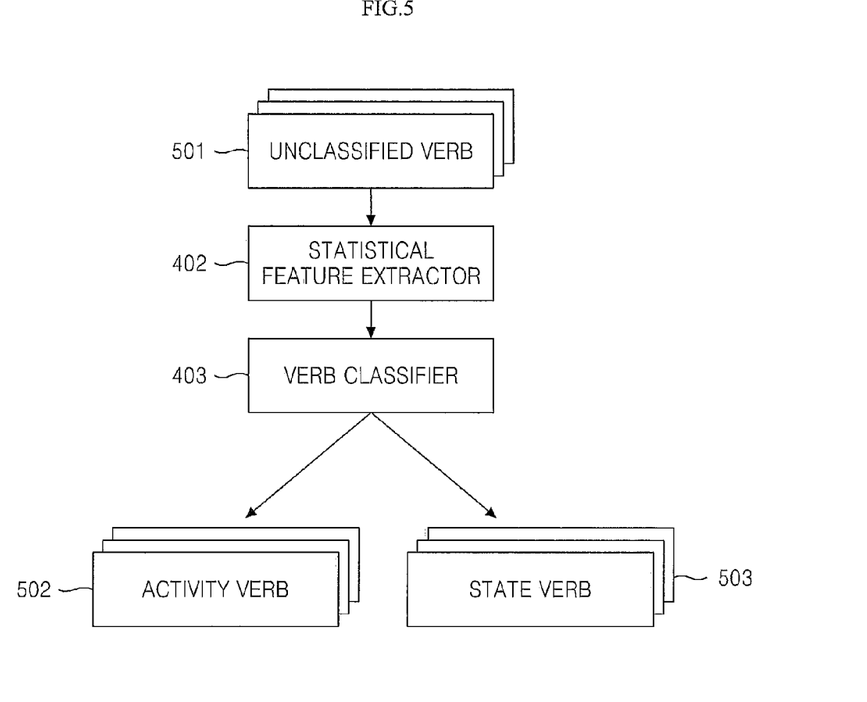
FIG. 5 is a conceptual diagram illustrating a process of classifying an activity verb according to an exemplary embodiment of the present invention.

FIG. 5 is a conceptual diagram illustrating a process of classifying an activity verb according to an exemplary embodiment of the present invention.

As illustrated in the drawing, the process of classifying an activity verb according to an exemplary embodiment of the present invention involves unclassified verbs 501, a statistical feature extractor 402, a verb classifier 403, activity verbs 502, and state verbs 503.

The unclassified verbs 501 are verbs and verb phrases that are not classified as activity verbs or state verbs. For example, all verbs and verb phrases may be collected from WordNet, which is a famous electronic dictionary in the corresponding field.

The statistical features extracted from the unclassified verbs 501 by the statistical feature extractor 402 are classified by the previously generated verb classifier 403, resulting in the activity verbs 502 and the state verbs 503

A method for the statistical feature extractor 402 to extract features according to an exemplary embodiment of the present invention will be described below with reference to FIG. 6.

Figure 6:
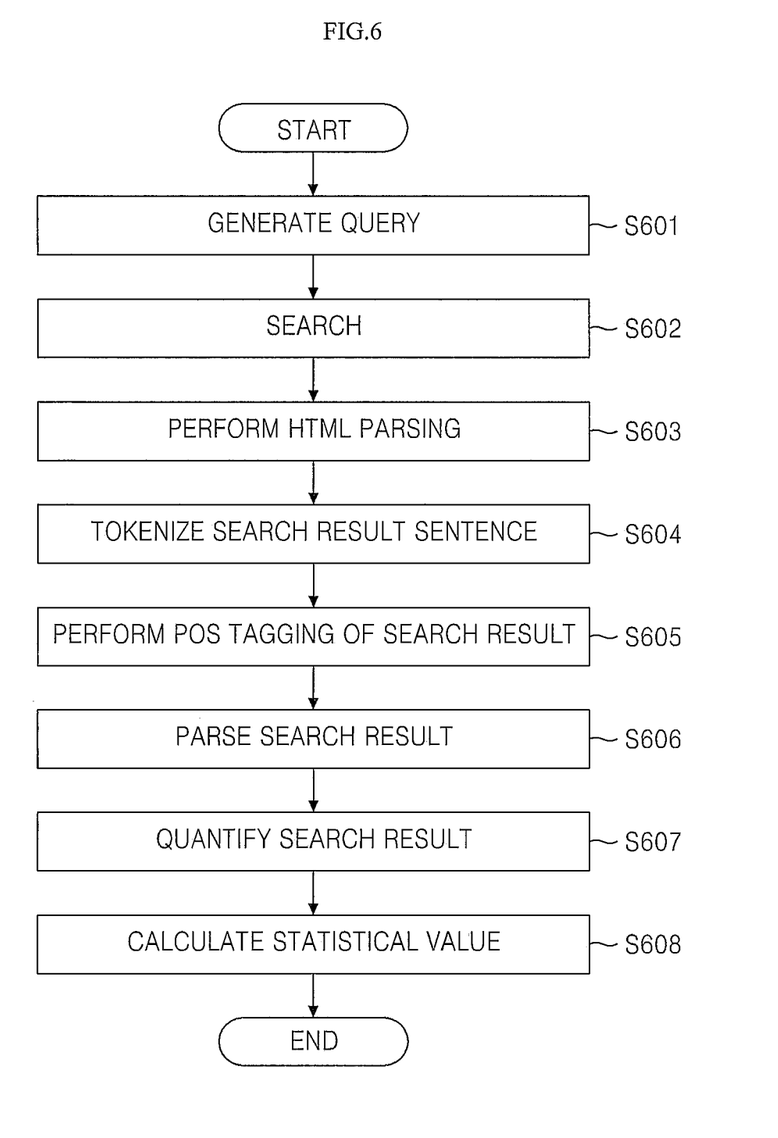
FIG. 6 is a flowchart illustrating a process of extracting statistical features for classifying an activity verb according to an exemplary embodiment of the present invention.

FIG. 6 is a flowchart illustrating a process of extracting statistical features for classifying an activity verb according to an exemplary embodiment of the present invention.

Referring to FIG. 6, first, five queries are generated for a verb from which statistical features will be extracted (S601). When a given verb is θ, queries are automatically generated as shown in Table 2 below using the above-mentioned verb classification tests.

TABLE 2

| Test | Query |
|---|---|
| Progressive | "(be OR am OR is OR are OR was OR were OR been) the progressive form of θ" |
| Force | "(force OR forces OR forcing OR forced) to θ" |
| Persuade | "(persuade OR persuades OR persuading OR persuaded) to θ" |
| Stop | "(stop OR stops OR stopped) the progressive form of θ" |
| For | "θ for an hour" OR "θ for a minute" OR "θ for a day" |
| Carefully | "θ carefully" |

Subsequently, the five queries of Table 2 are generated and raised for each of the unclassified verbs 501, and search results are returned (S602). In an exemplary embodiment of the present invention, an API of a search engine or a crawling method may be used to automatically query several thousands of verbs and return search results.

Subsequently, since a returned result is a webpage in an HTML form, HTML parsing is performed as a preprocess (S603).

Subsequently, sentence tokenization (S604), POS tagging (S605), and parsing (S606) are performed on the returned results to extract statistical features required for verb classification, thereby performing preprocessing to obtain basic statistical information.

Subsequently, three basic values are extracted from the search results (S607). In an exemplary embodiment of the present invention, the three basic values may be a hit count, candidate sentence count, and correct sentence count.

The hit count denotes the number of result pages corresponding to a query. As the hit count, only an actual value is extracted from search result pages using a regular expression.

The candidate sentence count denotes the number of sentences including verbs to be classified among sentences in the search results. The candidate sentence count is obtained by determining whether the corresponding verb is in each sentence and counting sentences including the verb.

The correct sentence count denotes the number of sentences satisfying an intended test among sentences including verbs to be classified (i.e., candidate sentences). For example, in a sentence "Is building an artifact?", "Is building" seems to satisfy the progressive test. However, "building" in the sentence is used not as a verb but as a noun, and the test is not satisfied. The correct sentence count is obtained on the basis of a rule using parsing information and POS information.

Subsequently, statistical values are calculated using the search result values (S608). When the hit count is $H_i(\theta)$, the candidate sentence count is $S_i(\theta)$, and the correct sentence count is $C_i(\theta)$ (where i denotes a test type and θ denotes a verb), the following three statistical values are calculated by Equation 1, Equation 2, and Equation 3 (S608).

$$\text{Absolute hit ratio: } A_i(\theta) = \frac{H_i(\theta)}{H_i(*)} \quad \text{[Equation 1]}$$

$$\text{Relative hit ratio: } R_i(\theta) = \frac{H_i(\theta)}{H_\Phi(\theta)} \quad \text{[Equation 2]}$$

$$\text{Valid ratio: } V_i(\theta) = \frac{C_i(\theta)}{S_i(\theta)} \quad \text{[Equation 3]}$$

Here, * is a wild card denoting all words, and Φ denotes that no test is performed.

When the wild card is queried, the search engine automatically matches all words to the wild card position. In other words, $H_\Phi(\theta)$ denotes a hit count obtained when a verb θ is queried to the search engine without generating a test query, and $H_i(*)$ denotes a hit count obtained by matching all words to the wild card position in an i-th test.

The absolute hit ratio is calculated for absolute comparison between statistical values of verbs. The relative hit ratio is calculated to relatively compare the statistical proportion of corresponding tests for a verb with those of the other verbs. The valid hit ratio is a ratio of sentences actually satisfying verb classification tests. For each verb, the three statistical values are calculated from the five tests. The calculated statistical values are used for verb classifier training and verb classification.

In various embodiments, the present invention, or portions of the present invention, may be implemented on a variety of computing devices and systems, wherein these computing devices include the appropriate processing mechanisms and computer-readable storage medium for storing and executing computer-readable instructions, such as programming instructions, code, and the like. Portions of the embodiments may be implemented in a web server running one or more processes, for example, web server applications, to respond to various requests, for example, HTTPS, HTTP and/or FTP, from remote browsers on computers. Through HTTP, the exchange system may provide a user interface graphics to various embodiments. The computing system environment may include, but not limited to, at least one computer having certain components for appropriate operation, execution of code, and creation and communication of data. For example, the computer includes a processing unit (typically referred to as a central processing unit or CPU) that serves to execute computer-based instructions received in the appropriate data form and format. Further, this processing unit may be in the form of multiple processors executing code in series, in parallel, or in any other manner for appropriate implementation of the computer-based instructions.

In order to facilitate appropriate data communication and processing information between the various components of the computer, a system bus is utilized. The system bus may be any of several types of bus structures, including a memory bus or memory controller, a peripheral bus, or a local bus using any of a variety of bus architectures. In particular, the system bus facilitates data and information communication between the various components (whether internal or external to the computer) through a variety of interfaces, as discussed hereinafter.

The computer may include a variety of discrete computer-readable media components. For example, this computer-readable media may include any media that can be accessed by the computer, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer. Further, this computer-readable storage medium may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

The computer may further include a system memory with computer storage media in the form of volatile and non-volatile memory, such as ROM and RAM. A basic input/output system (BIOS) with appropriate computer-based routines assists in transferring information between components within the computer and is normally stored in ROM. The RAM portion of the system memory typically contains data and program modules that are immediately accessible to or presently being operated on by processing unit, e.g., an operating system, application programming interfaces, application programs, program modules, program data and other instruction-based computer-readable codes.

A user may enter commands, information, and data into the computer through certain attachable or operable input devices, such as a keyboard, a mouse, etc., via a user input interface. Of course, a variety of such input devices may be utilized, e.g., a microphone, a trackball, a joystick, a touch-pad, a touch-screen, a scanner, etc., including any arrangement that facilitates the input of data, and information to the computer from an outside source. As discussed, these and other input devices are often connected to the processing unit through the user input interface coupled to the system bus, but may be connected by other interface and bus structures, such as a parallel port, game port, or a universal serial bus (USB). Still further, data and information can be presented or provided to a user in an intelligible form or format through certain output devices, such as a monitor (to visually display this information and data in electronic form), a printer (to physically display this information and data in print form), a speaker (to audibly present this information and data in audible form), etc. All of these devices are in communication with the computer through an output interface coupled to the system bus. It is envisioned that any such peripheral output devices be used to provide information and data to the user.

The computer may operate in a network environment through the use of a communications device, which is integral to the computer or remote therefrom. This communications device is operable by and in communication to the other components of the computer through a communications interface. Using such an arrangement, the computer may connect with or otherwise communicate with one or more remote computers, such as a remote computer, which may be a personal computer, a server, a router, a network personal computer, a peer device, or other common network nodes, and typically includes many or all of the components described above in connection with the computer. Using appropriate communication devices, e.g., a modem, a network interface or adapter, etc., the computer may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers may be used.

As used herein, the computer includes or is operable to execute appropriate custom-designed or conventional software to perform and implement the processing steps of the method and system of the present invention, thereby, forming a specialized and particular computing system. Accordingly, the presently-invented method and system may include one or more computers or similar computing devices having a computer-readable storage medium capable of storing computer-readable program code or instructions that cause the processing unit to execute, configure or otherwise implement the methods, processes, and transformational data manipulations discussed hereinafter in connection with the present invention. Still further, the computer may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

The computer represents one or more work stations appearing outside the local network and bidders and sellers machines. The bidders and sellers interact with computer, which can be an exchange system of logically integrated components including a database server and web server. In addition, secure exchange can take place through the Internet using secure www. An e-mail server can reside on system computer or a component thereof. Electronic data interchanges can be transacted through networks connecting computer and computer. Third party vendors represented by computer can connect using EDI or www, but other protocols known to one skilled in the art to connect computers could be used.

An exemplary embodiment of the present invention classifies sentences in a blog document into experience sentences and non-experience sentences, thereby extracting experiences that a user has actually had or that have happened to the user from the document.

Also, an exemplary embodiment of the present invention classifies verbs used in sentences in a blog document into activity verbs and state verbs, thereby distinguishing actions that the blog user has actually taken and collecting accurate information.

For example, using a method according to an exemplary embodiment of the present invention, in the case of a blog relating to travel, it is possible to extract actual experiences of users at specific places rather than commercial information, and in the case of a blog relating to a product, it is possible to extract experiences of users who have actually used the product.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of extracting an experience sentence from a blog document, comprising:
    generating a sentence classifier using a machine learning algorithm based on grammatical features; and
    classifying experience sentences that represent actual experiences of users and non-experience sentences that represent no experience in the blog document using the sentence classifier,
    wherein generating the sentence classifier includes extracting the grammatical features from given training data, and wherein extracting the grammatical features from the given training data includes extracting verb classes from the sentences.

2. The method of claim 1, wherein generating the sentence classifier includes:
    generating the sentence classifier for classifying sentences using the machine learning algorithm based on the extracted grammatical features.

3. The method of claim 1, wherein the machine learning algorithm is a support vector machine (SVM) algorithm.

4. The method of claim 2, wherein extracting the grammatical features from the given training data includes:
    extracting tense from sentences included in the training data;
    extracting mood from the sentences;
    extracting aspect from the sentences;
    extracting modality from the sentences; and
    extracting experiencers from the sentences.

5. The method of claim 4, wherein extracting the tense includes extracting the tense by part-of-speech (POS) tagging.

6. The method of claim 4, wherein extracting the mood includes extracting the mood using punctuation marks and orders of part-of-speech (POS) occurrences in the sentences.

7. The method of claim 4, wherein extracting the aspect includes extracting the aspect by part-of-speech (POS) tagging.

8. The method of claim 4, wherein extracting the modality includes extracting the modality using part-of-speech (POS) tagging and a modal dictionary.

9. The method of claim 4, wherein extracting the experiencers includes extracting the experiencers by parsing and using a named-entity recognizer.

10. The method of claim 4, wherein extracting the verb classes includes extracting the verb classes using an activity verb dictionary.

11. The method of claim 1, wherein classifying the experience sentences that represent actual experience of users and the non-experience sentences that represent no experience in the blog document using the sentence classifier includes:
    preprocessing text of the blog document;
    extracting grammatical features from the preprocessed blog document; and
    classifying the experience sentences and the non-experience sentences using the sentence classifier on the basis of the extracted grammatical features.

12. The method of claim 11, wherein preprocessing the text of the blog document includes performing hypertext markup language (HTML) parsing and sentence tokenization of the blog document.

13. The method of claim 11, wherein extracting the grammatical features from the preprocessed blog document includes:
    tagging the sentences from which the grammatical features will be extracted with parts-of-speech (POSs);
    parsing the sentences from which the grammatical features will be extracted;
    recognizing entity names of the sentences from which the grammatical features will be extracted;
    loading a dictionary for extracting grammatical features; and
    extracting tense, aspect, mood, modality, experiencer, and verb class features from the sentences using the dictionary.

14. A method of classifying a verb in a blog document, comprising:
    generating a verb classifier using a machine learning algorithm based on statistical features; and
    classifying activity verbs that represent acts and activities of a person and state verbs that represent feelings and perceptions of a person in a blog document using the sentence classifier.

15. The method of claim 14, wherein generating the verb classifier includes:
    extracting the statistical features from a training verb set including activity verbs and state verbs; and
    generating the verb classifier for classifying verbs using the machine learning algorithm based on the extracted statistical features.

16. The method of claim 15, wherein extracting the statistical features includes:
    generating an appropriate query about a given verb for a search engine; and
    extracting a statistical value of the query from the search engine.

17. The method of claim 16, wherein generating the appropriate query includes generating the query using a test pattern of Vendler's verb theory.

18. The method of claim 16, wherein extracting the statistical value of the query from the search engine includes extracting the statistical value using a search engine application programming interface (API) and a regular expression.

19. The method of claim 14, wherein the machine learning algorithm is a support vector machine (SVM) algorithm.

\* \* \* \* \*